US011321002B2

(12) United States Patent
Tamma et al.

(10) Patent No.: US 11,321,002 B2
(45) Date of Patent: May 3, 2022

(54) CONVERTING A VIRTUAL VOLUME BETWEEN VOLUME TYPES

(71) Applicant: HEWLETT PACKARD ENTERPRISE DEVELOPMENT LP, Houston, TX (US)

(72) Inventors: Roopesh Kumar Tamma, San Jose, CA (US); Marcel Furtado Almeida, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 628 days.

(21) Appl. No.: 16/215,962

(22) Filed: Dec. 11, 2018

(65) Prior Publication Data

US 2020/0183601 A1   Jun. 11, 2020

(51) Int. Cl.
*G06F 3/06*     (2006.01)
*G06F 9/455*    (2018.01)

(52) U.S. Cl.
CPC ............ *G06F 3/0641* (2013.01); *G06F 3/067* (2013.01); *G06F 3/0619* (2013.01); *G06F 9/45558* (2013.01); *G06F 2009/45583* (2013.01)

(58) Field of Classification Search
CPC .... G06F 3/0665; G06F 3/0661; G06F 3/0689; G06F 3/067; G06F 3/0641; G06F 3/0617; G06F 3/0619; G06F 9/45558; G06F 2009/45583
See application file for complete search history.

(56) References Cited

U.S. PATENT DOCUMENTS

| 8,073,816 | B1 | 12/2011 | Luke et al. |
| 8,635,429 | B1 | 1/2014 | Naftel et al. |
| 9,043,576 | B2 | 5/2015 | St. Laurent et al. |
| 9,817,592 | B1 | 11/2017 | Ratra et al. |
| 2010/0070725 | A1 | 3/2010 | Prahlad et al. |
| 2010/0088349 | A1 | 4/2010 | Parab |
| 2015/0324126 | A1* | 11/2015 | Nakajima ............. G06F 3/0647 711/114 |
| 2016/0110262 | A1* | 4/2016 | Nanivadekar ....... G06F 11/1456 707/654 |
| 2021/0042032 | A1* | 2/2021 | Yokoi ................... G06F 3/0665 |

OTHER PUBLICATIONS

VMWARE, "Enabling Clustering Features for an Existing Virtual Disk by Converting in Place," Jun. 13, 2014 (8 pages).

* cited by examiner

*Primary Examiner* — Etienne P Leroux
(74) *Attorney, Agent, or Firm* — Trop, Pruner & Hu, P.C.

(57) ABSTRACT

In some examples, a system converts a virtual volume from a first volume type to a second volume type without modifying the virtual volume, the converting comprising accessing a source metadata associated with the virtual volume, the source metadata including information for the first volume type, and generating a destination metadata associated with the virtual volume, the destination metadata including information for the second volume type. While the virtual volume is being converted from the first volume type to the second volume type, the system processes a write operation that accesses a portion of the virtual volume and changes data in the accessed portion of the virtual volume.

20 Claims, 6 Drawing Sheets

CONVERTING A VIRTUAL VOLUME BETWEEN VOLUME TYPES

BACKGROUND

A storage system can store data accessible by an electronic device. In some cases, a storage system can store data in a virtual volume. A virtual volume does not actually store the underlying data, but rather, refers to data in a physical data store.

BRIEF DESCRIPTION OF THE DRAWINGS

Some implementations of the present disclosure are described with respect to the following figures.

Figure 1:
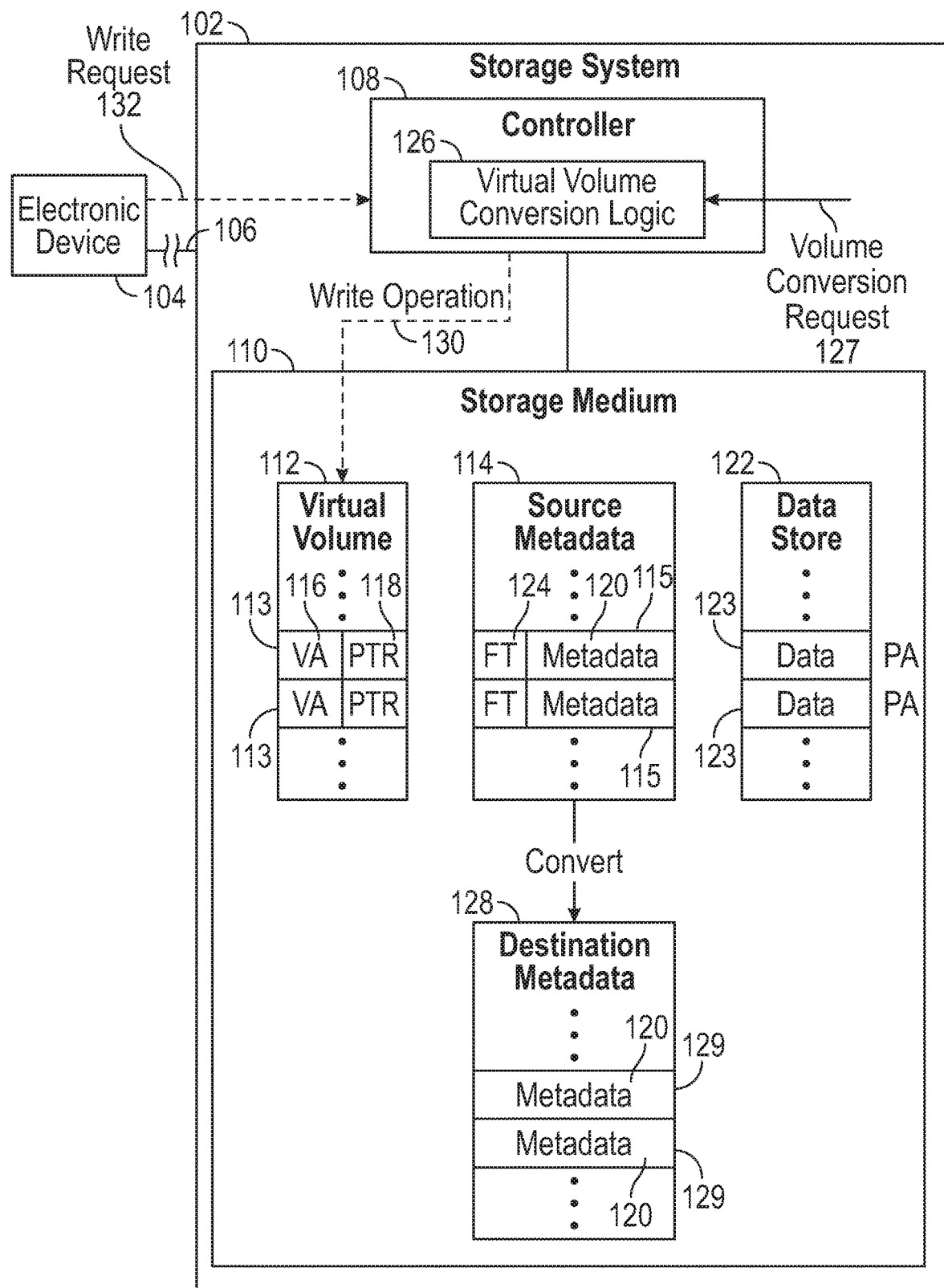
FIG. 1 is a block diagram of an arrangement that includes a storage system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A storage system can use a virtual volume to store data. In such an arrangement, the data is actually not stored in the virtual volume itself, but rather, the virtual volume includes information that can be used to refer to the data that is stored in a physical data store. In some examples, a virtual volume can be a "thin" virtual volume, where the storage space of the physical data store is allocated as write operations are received that write new data to the virtual volume. In other words, the storage space for the virtual volume is not pre-allocated, but allocated on demand. In other examples, other forms of virtual volumes can be employed.

Metadata can be associated with the virtual volume. Information in the virtual volume is used to correlate entries of the virtual volume to respective entries of the data referred to by the virtual volume. In some cases, the metadata is included in a data store that is separate from the virtual volume (e.g., the metadata can be included in a file or other data containing structure that is separate from the virtual volume). In other cases, the metadata can be stored in a part of the virtual volume.

The virtual volume includes entries that contain virtual addresses along with other information. The entries of the virtual volume can include pointers that reference respective entries of the metadata. A "pointer" includes a reference value that can be used to locate a location of corresponding stored information. The entries of the metadata can include address mapping information that maps virtual addresses of the virtual volume to corresponding physical addresses of a physical data store that stores data referred to by the virtual volume.

In some cases, the entries of the metadata can also include information relating to a feature supported by the virtual volume. For example, features can include any or some combination of the following: data deduplication, data compression, and so forth. Data deduplication involves identifying duplicate instances of a piece of data at different storage locations, and storing just one instance of the piece of data so that the multiple storage locations each point to the same piece of data, to avoid duplication of the piece of data. Data compression refers to compressing data such that a smaller amount of storage space is used for storing the data than if an uncompressed data were stored.

Different metadata associated with different virtual volumes can implement use of different features by the different virtual volumes. For example, a first virtual volume can implement data deduplication, while a second virtual volume does not implement data duplication but implements data compression. A third virtual volume can be implemented without using either data deduplication or data compression. A fourth virtual volume can implement data compression and data deduplication.

In other examples, different virtual volumes can be associated with different versions of metadata. For example, different versions of metadata can specify the use of different versions of deduplication, or different versions of data compression, and so forth.

Different virtual volumes implemented with different features and/or being associated with different versions of metadata can be referred to as being according to different volume types. For example, a virtual volume according to a first volume type can implement a given feature (e.g., data deduplication, data compression, etc.), while a virtual volume according to a second volume type does not implement the given feature. As another example, a virtual volume according to a first volume type uses a first version of metadata, while a virtual volume according to a second volume type uses metadata according to a different second version.

A virtual volume can be converted from a first volume type to a different second volume type. In some examples, such volume conversion can involve reading data from a source virtual volume according to the first volume type, and writing the data read from the source virtual volume to a newly created destination virtual volume according to the second volume type. More specifically, the source virtual volume stores data in a first physical data store, while the destination virtual volume stores data in a different second physical data store. Thus, the volume conversion involves reading data from the first physical data store for the source virtual volume, and writing the data read from the first physical data store to the second physical data store for the destination virtual volume.

The first and second physical data stores for the respective source and destination virtual volumes can cause consumption of up to double the amount of storage space of a storage medium during the conversion of the source virtual volume to the destination virtual volume. The increased storage resources allocated for performing the volume conversion may be unavailable for storage of other data while the volume conversion is in progress. Moreover, in some cases, the storage medium may run out of storage space so that the volume conversion cannot take place or cannot complete, or alternatively, additional storage resources may have to be allocated which can increase storage costs.

In accordance with some implementations of the present disclosure, volume conversion of a virtual volume from a first volume type to a second volume type can be performed without modifying the virtual volume, i.e., the virtual volume remains in place (remains in the storage space allocated to the virtual volume) and is not changed to a destination virtual volume. Instead, the metadata associated with the virtual volume is changed from a source metadata to a destination metadata. The source metadata includes information for the first volume type, and the destination metadata includes information for the second volume type. For example, the source metadata can include information that supports a feature (e.g., data deduplication, data compression, etc.), while the destination metadata does not include the information supporting the feature (or vice-versa). As another example, the source metadata includes information according to a first metadata version, and the destination metadata includes information according to a different second metadata version.

While the volume conversion is in progress, write operations to the virtual volume can continue, where the write operations access respective portions of the virtual volume and can change data referred to by the accessed portions of the virtual volume. By allowing write operations to continue during the volume conversion, storage system performance is enhanced since other devices can continue to access data of the virtual volume (as opposed to examples where write operations are disallowed during the volume conversion). Since the volume conversion according to some implementations of the present disclosure does not actually move data in the physical data store to a different storage region, write operations to the virtual volume during the volume conversion can simply update the respective data in the physical data store. In some cases where a given write operation can cause a change in the metadata, information of the given write operation can be stored in a replay log and replayed after the volume conversion is completed to update the metadata.

FIG. 1 is a block diagram of an example arrangement that includes a storage system 102 accessible by an electronic device 104 over a link 106. The link 106 can include a network, such as a local area network (LAN), a storage area network (SAN), or any other type of network. Alternatively, the link 106 can include a dedicated channel between the electronic device 104 and a storage system 102.

Examples of the electronic device 104 can include a desktop computer, a notebook computer, a tablet computer, a server computer, a smartphone, and so forth. Although just one electronic device 104 is shown in FIG. 1, it is noted that in other examples, there can be multiple electronic devices that are able to access the storage system 102.

The storage system 102 can be implemented using one physical node or multiple physical nodes. A "physical node" can refer to a computer, an electronic device, a storage device, or any type of physical computing and/or storage platform. The storage system 102 includes a controller 108 and a storage medium 110 to store various information. For example, any storage system described herein may be at least one storage array comprising at least one storage controller to store data on a plurality of storage devices.

As used here, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

If the storage system 102 is distributed across multiple physical nodes, then the controller 108 would be distributed across multiple physical nodes.

The storage medium 110 can be implemented using a storage device (or multiple storage devices), such as disk-based storage devices (e.g., hard disk drives (HDDs)), solid state drives (SSDs), other non-volatile storage device(s), memory devices, or the like. In examples where the storage system 102 includes multiple physical nodes, the storage medium 110 is distributed across the multiple physical nodes.

In some examples, the storage medium 110 can include storage at various different levels. For example, the storage medium 110 can include a persistent store (e.g., solid-state memory device(s), disk-based storage device(s), etc.), a system memory (e.g., dynamic random access memory (DRAM) device(s), static random access memory device(s), etc.), a cache memory (e.g., DRAM device(s), SRAM device(s), etc.), and/or further storage.

As shown in FIG. 1, the storage medium 110 stores a virtual volume 112 that is associated with a metadata 114 (which is referred to as a "source metadata" subject to conversion). The source metadata 114 can be separate from the virtual volume 112, or can be part of the virtual volume 112. Entries 113 of the virtual volume 112 are associated with respective entries 115 of the source metadata 114. In some examples, each entry 113 of the virtual volume 112 includes a respective virtual address (VA) 116 and a pointer (PTR) 118. The pointer 118 references a corresponding entry 115 of the source metadata 114.

Figure 2:
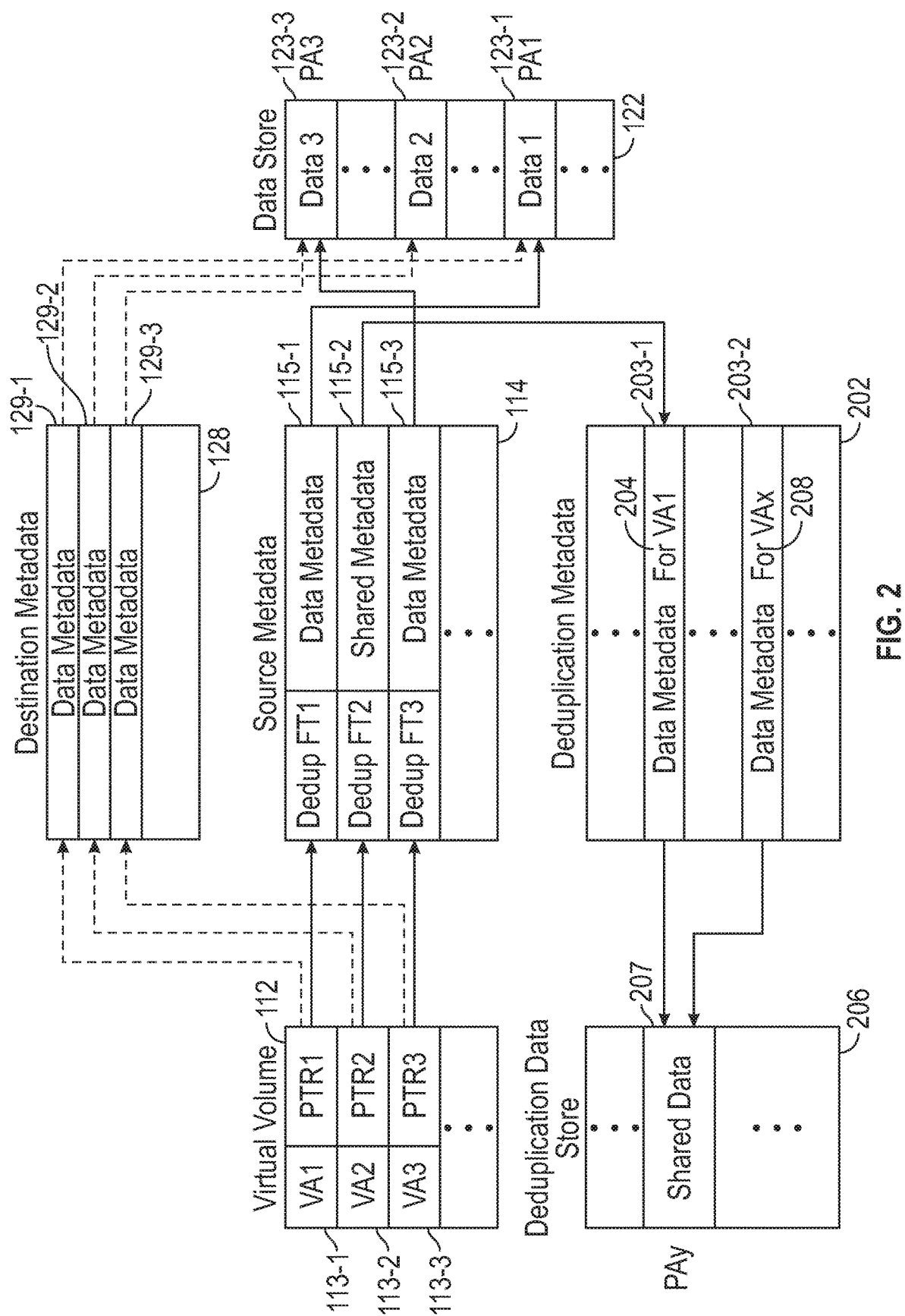
FIG. 2 is a block diagram of various volumes, metadata, and data stores, according to some examples.

Each entry 115 of the source metadata 114 includes a respective metadata 120, which can include address mapping information that maps the virtual address 116 to a corresponding physical address in a physical data store 122 that stores data referred to by the virtual volume 112. The data store 122 can have multiple storage locations 123 that are addressed by respective different physical addresses (PA). If data deduplication is supported, then the metadata 120 of an entry 115 of the source metadata 114 can refer to a deduplication metadata instead of to a storage location 123 of the data store 122 (such a deduplication metadata is depicted in FIG. 2).

In addition, each entry 115 of the source metadata 114 can include a feature tag 124 that includes information relating to a feature that is supported by the virtual volume 112. A "feature tag" can refer to information that is related to a feature supported by the corresponding virtual volume. For example, if the feature that is supported by the virtual volume 112 is data deduplication, then the feature tag 124 can include information indicating whether or not the corresponding data referred to by the respective entry 113 of the virtual volume 112 has been deduplicated. For example, the feature tag 124 can be set to a first value to indicate that the data has been deduplicated, and to a second value to indicate that the data has not been deduplicated.

If the feature is data compression, then the feature tag 124 can indicate whether or not the corresponding data referred to by the respective entry 113 of the virtual volume 112 has been compressed. For example, the feature tag 124 can be set to a first value to indicate that the data has been compressed, and to a second value to indicate that the data has not been compressed.

In other examples, if the virtual volume 112 does not implement data deduplication, data compression, or another feature, then the feature tags 124 can be omitted from the entries 115 of the source metadata 114.

As noted above, the storage medium 110 can include multiple levels of storage. In such examples, the data store 122 can be stored in a persistent storage, whereas the virtual volume 112 and the associated source metadata 114 can be stored in a system memory that has a higher access speed than the persistent store. In further examples, a portion of the data store 122 can also be stored in the system memory, such as when data is paged in from the data store 122 to the system memory during a read or write operation. In further examples, the storage medium 110 is just implemented with one level of storage.

The controller 108 includes a virtual volume conversion logic 126 to perform volume conversion of the virtual volume 112 from the first volume type (as specified by the source metadata 114) to a different second volume type (as specified by a destination metadata 128). The volume conversion of the virtual volume 112 between different volume types can be initiated in response to a volume conversion request 127, which can be based on input from a user or another entity such as a machine or program. Alternatively, the virtual volume conversion logic 126 can make a decision to initiate the volume conversion based on a condition or event detected by the virtual volume conversion logic 126.

The virtual volume conversion logic 126 can be implemented using a portion of the hardware processing circuit of the controller 108, or can be implemented using machine-readable instructions executable on the controller 108. In other examples, the virtual volume conversion logic 126 can be implemented using a hardware processing circuit or a combination of a hardware processing circuit and machine-readable instructions that is separate from the controller 108.

To perform the volume conversion of the virtual volume 112 from the first volume type to the second volume type, the virtual volume conversion logic 126 generates a destination metadata 128, while leaving the virtual volume 112 unmodified; in other words, data referred to by the virtual volume 112 remains in place in its original storage location while the metadata associated with the virtual volume 112 is changed from the source metadata 114 to the destination metadata 128. More specifically, the data in the data store 122 referred to by the virtual volume remains in place, i.e., is not copied from one storage location to another storage location for the volume conversion. As a result, during the volume conversion, additional storage space for maintaining separate data for a source virtual volume and a destination virtual volume does not have to be provided.

As an example, the volume conversion can involve changing the virtual volume 112 from the first volume type that supports a feature to the second volume type where the feature is not supported. In this case, the source metadata 114 can be translated to the destination metadata 128 by removing the feature tags 124 from the corresponding entries of the source metadata 114, such that the entries 129 added to the destination metadata 128 includes the address information 120 without including the corresponding feature tags 124.

In other examples, the reverse can be performed, where the virtual volume 112 can be converted from the first volume type where a feature is not supported, to the second volume type where the feature is supported. In this case, the virtual volume conversion logic 126 generates feature tags for the feature, and the generated feature tags are added to the corresponding entries 129 of the destination metadata 128.

The controller 108 includes a virtual volume conversion logic 126 that is able to perform conversion of the virtual volume 112 between different volume types. The virtual volume conversion logic 126 can be part of the hardware processing circuit of the controller 108, or can be implemented as machine-readable instructions executable by the controller 108.

In some examples, once the volume conversion is completed, pointer metadata can be modified so that the pointers 118 in corresponding entries 113 of the virtual volume 112 refer to the corresponding entries of the destination metadata 128 instead of the entries 115 of the source metadata 114. In some examples, the pointer metadata that is modified can be the individual pointers 118 themselves. In other examples, instead of changing each pointer 118 of the entries 113 of the virtual volume 112 individually, a global pointer metadata can be used. Prior to completion of the volume conversion, the global pointer metadata indicates that the pointers 118 of the entries 113 of the virtual volume 112 refer to the source metadata 114. In response to completion of the volume conversion, the global pointer metadata is changed by the virtual volume conversion logic 126 to indicate that the pointers 118 of the entries 113 of the virtual volume 112 refer to corresponding entries of the destination metadata 128.

In accordance with some implementations of the present disclosure, the volume conversion is an online volume conversion, which means that the virtual volume 112 continues to be available (for both write and read accesses) while being converted. While volume conversion of the virtual volume 112 is in progress, the controller 108 is able to perform a write operation 130 with respect to the virtual volume 112. The write operation 130 can be performed by the controller 108 in response to a write request 132 received from the electronic device 104 (or from another requester). The write operation 130 can add data to the virtual volume 112, modify data of the virtual volume 112, or delete data from the virtual volume 112. Adding data to the virtual volume 112 involves adding an entry to the virtual volume 112, adding a corresponding entry to the source metadata 114, and adding the data to a new storage location in the data store 122. Modifying data of the virtual volume 112 involves modifying the data stored in a respective storage location of the data store 122. Deleting data from the virtual volume 112 involves removing an entry from the virtual volume 112, removing an entry from the source metadata 114, and removing data from a storage location of the data store 122. Removing an entry from a virtual volume or a source metadata can refer to invalidating the entry (without actually performing the removal). Similarly, removing data from a storage location of the data store 122 can refer to invalidating the data.

In further examples, note that any write operation during the volume conversion to the virtual volume 112 that causes a change of the associated metadata can cause information of the write operation to be first stored in a replay log, and the write operation can then be replayed once the volume conversion is completed (the write logging and write replay are discussed further below). From the perspective of the electronic device 104 or other requester of the write operation, even though the write operation is logged, an indication can still be provided back to the requester that the write has completed. The replay log to which the information of the write operation is written can be stored in a persistent storage, such that the content of the replay log is maintained even if power is lost or the storage system 102 crashes.

FIG. 2 shows an example where the source metadata 114 includes information supporting data deduplication of data referred to by the virtual volume 112. In the example of FIG. 2, three entries 113-1, 113-2, and 113-3 of the virtual volume 112 are shown. The entry 113-1 includes virtual address VA1 and a pointer PTR1 referencing a respective entry 115-1 of the source metadata 114. Similarly, the entry 113-2 includes virtual address VA2 and a pointer PTR2 referencing an entry 115-2 of the source metadata 114, and the entry 113-3 includes virtual address VA3 and a pointer PTR3 referencing an entry 115-3 of the source metadata 114.

The entries 115-1, 115-2, and 115-3 include respective deduplication feature tags DEDUP FT1, DEDUP FT2, and DEDUP FT3 that are set to respective values to indicate whether or not data referred to by the respective entries 113-1, 113-2, and 113-3 of the virtual volume 112 have been deduplicated. In the example of FIG. 2, it is assumed that DEDUP FT1 and DEDUP FT3 indicates that the respective data have not been deduplicated. As a result, the entries 115-1 and 115-3 of the source metadata 114 include corresponding data metadata with address mapping information that maps VA1 and VA3 to respective physical addresses PA1 and PA3. The physical address PA1 mapped from VA1 identifies a storage location 122-1 in the data store 122, and the physical address PA3 mapped from VA3 identifies a storage location 122-3 of the data store 122. In other words, the storage location 123-1 of the data store 122 stores the data (Data 1) for VA1, while the storage location 123-3 stores the data (Data 3) for VA3.

In the example of FIG. 2, it is further assumed that DEDUP FT2 in the entry 115-2 of the source metadata 114 indicates that the respective data has been deduplicated. The entry 115-2 further stores shared metadata that includes a pointer referencing an entry 203-1 of a deduplication metadata 202. The entry 203-1 includes metadata 204 with address mapping information that maps the virtual address VA1 to a physical address PAy that identifies a storage location 207 of a deduplication data store 206. Each storage location 207 of the deduplication data store 206 stores shared data that is potentially referred to by multiple virtual addresses.

In some examples, the deduplication metadata 202 further includes another entry 203-2 storing data metadata 208 with address mapping information that maps another virtual address VAx (contained in a corresponding entry of the virtual volume 112) to the same PAy as the address information 204 for VA1.

In alternative examples, multiple source metadata entries containing respective shared metadata can refer to a single deduplication metadata entry 203-1. For example, the source metadata 114 can include an additional source metadata entry 115-x that refer to the deduplication metadata entry 203-1 (in addition to the source metadata entry 115-2).

While the duplication data store 206 includes entries that store shared data, the data store 122 includes entries that store unshared data.

In some examples, a volume conversion of the virtual volume 112 can be performed to convert from the first volume type where data deduplication is supported to the second volume type where data deduplication is not supported. In the example of FIG. 2, the virtual volume conversion logic 126 generates the destination metadata 128, which has entries 129-1, 129-2, and 129-3. The entries 129-1 and 129-3 of the destination metadata 128 can be copied from the corresponding entries 115-1 and 115-3 of the source metadata 114, since these entries refer to non-deduplicated data. However, the 129-1 and 129-3 of the destination metadata 128 are without the deduplication feature tags (DEDUP FT1 and DEDUP FT3) included in the corresponding entries 115-1 and 115-3 of the source metadata 114.

The entry 129-2 of the destination metadata 128 includes data metadata including address mapping information that maps VA2 to PA2, in contrast to the entry 115-2 of the source metadata 114 that includes shared metadata referring to the entry 203-1 of the deduplication metadata 202. The entry 129-2 of the destination metadata 128 is also without the deduplication feature tag (DEDUP FT2) included in the corresponding entry 115-2 of the source metadata 114. The data metadata in the entry 129-2 of the destination metadata 128 references a storage location 123-2 of the data store 122, which stores the data of virtual address VA2. Note that as part of this volume conversion, data (Data 2) is copied (such as from the entry 207 of the deduplication data store 206) to the data store entry 123-2.

In some examples, once the volume conversion is complete, the virtual volume conversion logic 126 can change pointer metadata so that the pointers PTR1, PTR2, and PTR3 in the entries 113-1, 113-2, and 113-3 of the virtual volume 112 reference the entries 129-1, 129-2, and 129-3 of the destination metadata 128 instead of the entries 115-1, 115-2, and 115-3 of the source metadata 114. For example, as noted above, the pointer metadata can include a global pointer metadata.

Figure 3:
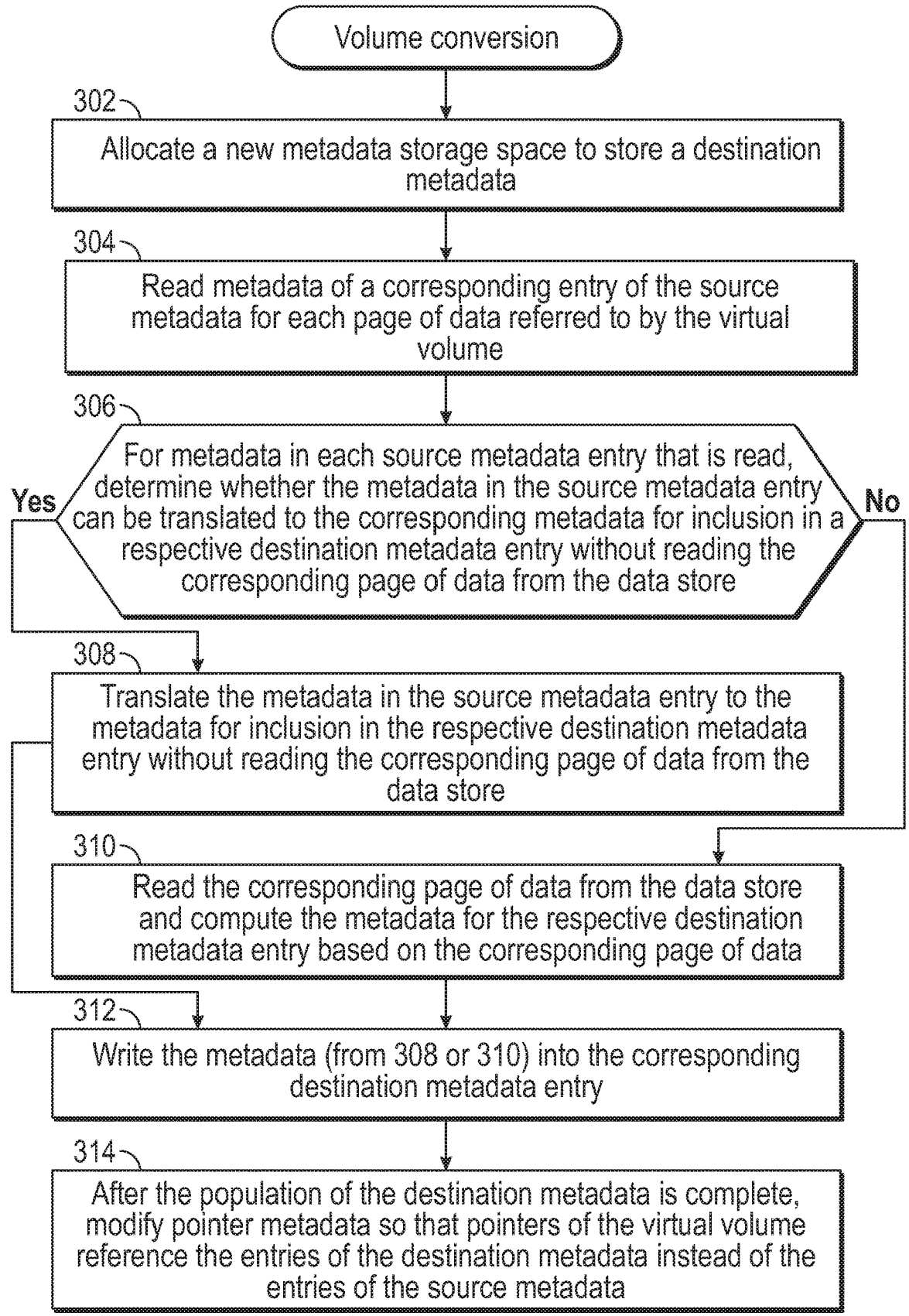
FIG. 3 is a flow diagram of a volume conversion process of converting a virtual volume from a first volume type to a second volume type, according to some examples.

FIG. 3 is a flow diagram of a volume conversion of a virtual volume (e.g., 112) performed by the virtual volume conversion logic 126 according to some examples. The volume conversion can be initiated in response to a request from an entity, or alternatively, can be initiated by the virtual volume conversion logic 126 based on detection of a condition or event.

To perform the volume conversion, the virtual volume conversion logic 126 allocates (at 302) a new metadata storage space to store the destination metadata 128 (FIG. 1). The new metadata space can be allocated in the storage medium 110. The allocated new metadata storage space defines a region of the storage medium 110 in which the destination metadata 128 can be stored.

The virtual volume conversion logic 126 reads (at 304) metadata of a corresponding entry 115 of the source metadata 114 for each page of data referred to by the virtual volume 112. A "page of data" refers to data of a certain size stored in the data store 122. For example, each storage location 123 of the data store 122 stores a corresponding page of data.

For metadata in each source metadata entry 115 that is read, the virtual volume conversion logic 126 determines (at 306) whether the metadata in the source metadata entry 115 can be translated to the corresponding metadata for inclusion in a respective entry 129 of the destination metadata 128 without reading the corresponding page of data from the data store 122.

If so, the virtual volume conversion logic 126 translates (at 308) the metadata in the source metadata entry 115 to the metadata for inclusion in the respective destination metadata entry 129 without reading the corresponding page of data from the data store 122.

However, if the metadata in the source metadata entry 115 cannot be translated to the corresponding metadata for inclusion in the respective entry 129 of the destination metadata 128 without reading the corresponding page of data from the data store 122, the virtual volume conversion logic 126 reads (at 310) the corresponding page of data from the data store 122 and computes the metadata for the respective destination metadata entry 129 based on the corresponding page of data.

The following provides some examples of when metadata translation can be performed with and without reading corresponding pages of data from the data store 122.

As an example, if the virtual volume 112 supports data compression, the source metadata 114 can include a compression feature tag 124 that indicates whether or not a corresponding page of data in the physical data store 122 has been compressed. The volume conversion of the virtual volume 112 is to convert the virtual volume 112 from a first volume type that supports data compression to a second volume type that does not support data compression.

The metadata in a given source metadata entry 115 can include the compression feature tag 124 set to a value indicating that the corresponding page of data in the data store 122 is compressed or not compressed. To translate the metadata in the given source metadata entry 115 to corresponding metadata of a corresponding destination metadata entry 129, the virtual volume conversion logic 126 can remove the compression feature tag 124 of the given source metadata entry 115, and the remaining portion of the metadata of the given source metadata entry 115 can be copied as the respective metadata of the corresponding destination metadata entry 129, without having to read the corresponding page of data from the data store 122 if the corresponding page of data is not compressed. If the corresponding page of data is compressed, then the compressed page of data would be read and decompressed to store the decompressed data at a new storage location in the data store 122.

In another example, if the virtual volume 112 does not support data deduplication, the source metadata 114 is without deduplication feature tags 124 that indicate whether or not corresponding pages of data in the physical data store 122 have been deduplicated. The volume conversion of the virtual volume 112 in this example is to convert the virtual volume 112 from a first volume type that does not support data deduplication to a second volume type that supports data deduplication. To translate the metadata in each source metadata entry 115 to metadata for inclusion in the corresponding destination metadata entry 129, the virtual volume conversion logic 126 generates a deduplication feature tag 124. The virtual volume conversion logic 126 also reads the corresponding page of data from the data store 122 for the purpose of determining whether the corresponding page of data is a duplicate of another page of data. If so, deduplication is to be performed, and the virtual volume conversion logic 126 sets the deduplication feature tag 124 to a value indicating that the corresponding page of data has been deduplicated, and generates shared metadata (such as included in the entry 115-2 of FIG. 2) that references a deduplication metadata (e.g., 202 in FIG. 2). Thus, to convert from a non-deduplicated virtual volume 112 to a deduplicated virtual volume 112, the virtual volume conversion logic 126 would have to read the corresponding pages of data from the data store 122.

In another example, converting the virtual volume 112 from a deduplicated virtual volume to a non-deduplicated virtual volume may or may not involve reading a corresponding page of data from the data store 122. For a first source metadata entry 115 with a deduplication feature tag 124 set to a value indicating that the corresponding page of data has not been deduplicated, the metadata of the first source metadata entry 115 can be translated to the metadata for a corresponding first destination metadata entry 129 without having to read the corresponding page of data. In this case, the virtual volume conversion logic 126 can simply remove the deduplication feature tag 124 from the first source metadata entry 115 and copy the remainder of the metadata of the first source metadata entry 115 to the first destination metadata entry 129.

However, to translate a second source metadata entry 115 with a deduplication feature tag 124 set to another value indicating that the corresponding page of data has been deduplicated, the virtual volume conversion logic 126 reads the corresponding shared page of data from a deduplication data store (e.g., from the entry 207 of the deduplication data store 206 in FIG. 2), and the shared page of data is copied to a corresponding location of the data store 122. To translate the metadata of the second source metadata entry 115, the virtual volume conversion logic 126 removes the deduplication feature tag 124, and generates metadata that references the storage location of the data store 122 to which the shared page of data has been copied.

The virtual volume conversion logic 126 writes (at 312) either the metadata translated at 308 or the metadata derived at 310 into the corresponding destination metadata entry 129.

Tasks 304-310 are performed iteratively for each source metadata entry to write respective derived metadata (translated at 308 or generated at 310) to each corresponding destination metadata entry.

Next, after the population of the destination metadata 128 is complete, the virtual volume conversion logic 126 modifies (at 314) pointer metadata (e.g., the global pointer metadata mentioned above) so that pointers of the virtual volume 112 (e.g., the pointers PTR or PTR1-PTR3 shown in FIG. 1 or 2) reference the entries of the destination metadata 128 instead of the entries of the source metadata 114.

Figure 4:
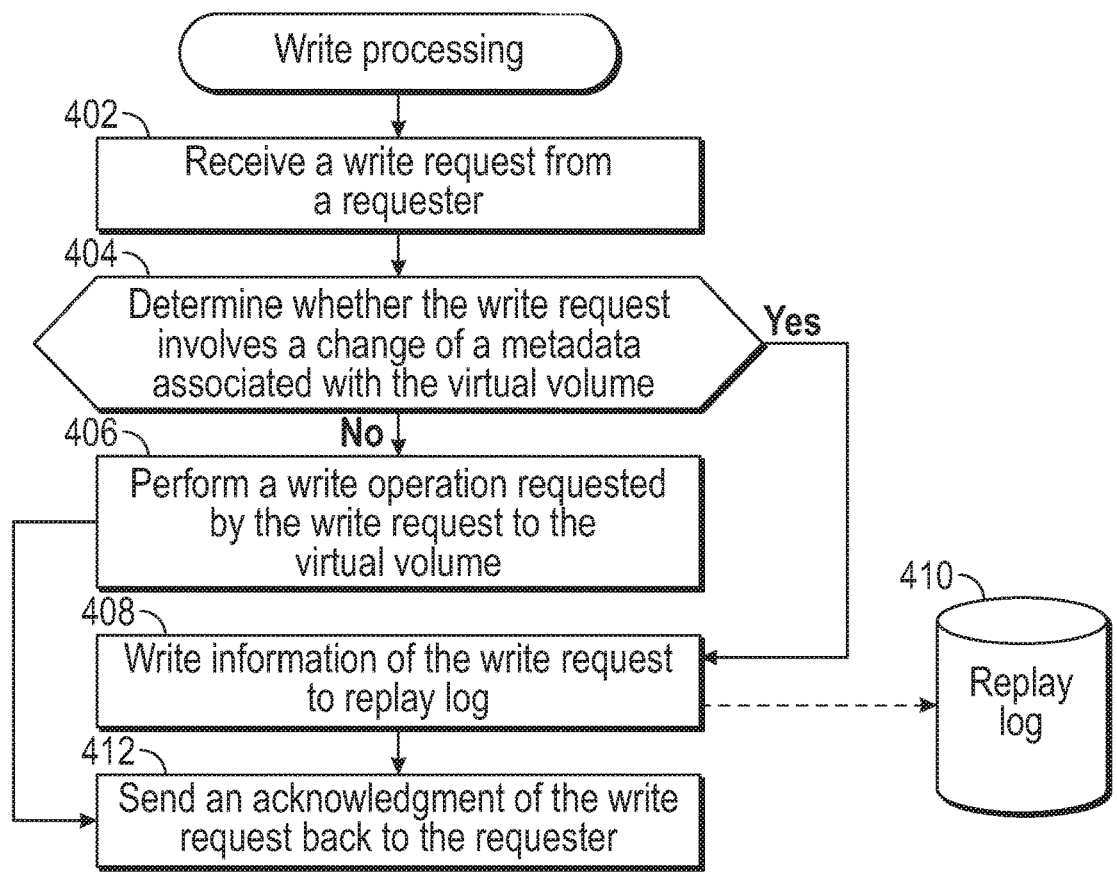
FIG. 4 is a flow diagram of write processing according to further examples.

FIG. 4 is a flow diagram of write processing during volume conversion of the virtual volume 112. The write processing can be performed by the controller 108 of FIG. 1, for example.

As noted above, the volume conversion is an online volume conversion. While the volume conversion of the virtual volume 112 is in progress, the controller 108 can continue to perform write operations to the virtual volume 112.

The controller 108 receives (at 402) a write request from a requester (e.g., the electronic device 104 of FIG. 1). There can be several types of write requests: a request to modify data in the data store 122 (also referred to as a "re-write" request), a request to add data to the data store 122 (also referred to as a "new write" request), and a request to delete data from the data store 122 (also referred to as a "zero write" request).

The controller 108 determines (at 404) whether the write request involves a change of a metadata associated with the virtual volume 112. If not, the controller 108 performs (at 406) a write operation requested by the write request to the virtual volume 112.

However, if the write request involves a change of a metadata associated with the virtual volume 112, the controller 108 writes (at 408) information of the write request to a replay log 410. The information of the write request written to the replay log 410 can include information indicating the type of write (e.g., a re-write, a new write, a zero write, etc.), the virtual address(es) to which the write request pertains, and the write data associated with the write request.

An example of a write request that does not change metadata is a re-write that modifies data of a virtual volume that does not implement deduplication. For a re-write, the write operation can simply update the corresponding storage location in the data store 122, without changing the metadata associated with the virtual volume.

An example of a write request that changes the metadata associated with a virtual volume is a new write (that adds new data) or a zero write (that deletes data). For a new write, a new metadata entry is added, and the metadata for the new metadata entry is computed and added to the new metadata entry. For a zero write, the corresponding metadata entry is invalidated.

As a further example, a re-write to a virtual volume that implements deduplication could also cause a change to the metadata associated with a virtual volume. A re-write to the virtual volume can involve a write of duplicated data, in which case the corresponding metadata entry is updated to reference a deduplication metadata (e.g., 202 in FIG. 2) rather than reference a data store (e.g., 122 in FIG. 1 or 2).

From either task 406 or 408, the controller 108 sends (at 412) an acknowledgment of the write request back to the requester. The acknowledgment provides an indication to the requester that the requested write operation has been performed. From the perspective of the requester, the requester is unaware whether the write operation was completed to the virtual volume 112 or was logged into the replay log 410.

Information of multiple write requests can be logged into respective entries of the replay log 410.

Figure 5:
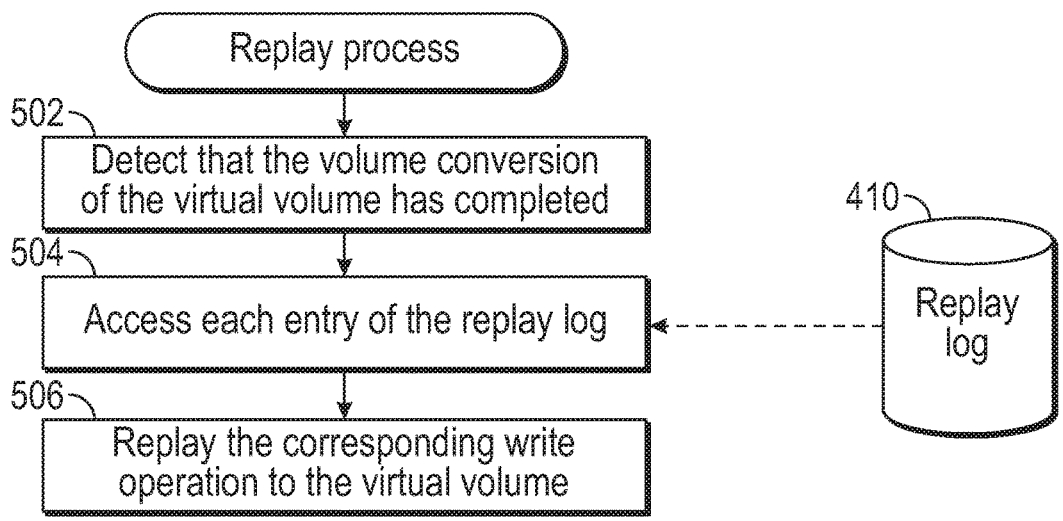
FIG. 5 is a flow diagram of replay log replaying according to further examples.

FIG. 5 is a flow diagram of a replay process, which can be performed by the controller 108 according to some examples. The controller 108 detects (at 502) that the volume conversion of the virtual volume 112 has completed. In response to detecting the completion of the volume conversion, the controller 108 accesses (at 504) each entry of the replay log 410, and replays (at 506) the corresponding write operation to the virtual volume 112.

The replay of the write operation can include updating a metadata entry of the destination metadata 128, such as adding a new metadata entry (e.g., for a new write) or invalidating an existing metadata entry (e.g., for a zero write) or changing metadata (e.g., for a re-write of a deduplicated virtual volume).

Figure 6:
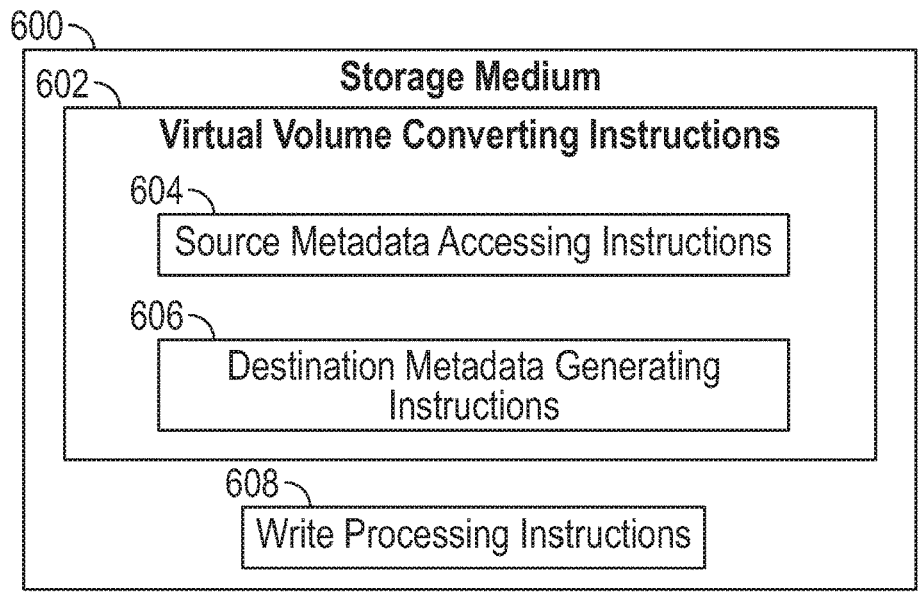
FIG. 6 is a block diagram of a storage medium storing machine-readable instructions according to some examples.

FIG. 6 is a block diagram of a non-transitory machine-readable or computer-readable storage medium 600 storing machine-readable instructions that upon execution cause a system (e.g., the storage system 102 of FIG. 1) to perform respective tasks.

The machine-readable instructions include virtual volume converting instructions 602 to convert a virtual volume from a first volume type to a second volume type without modifying the virtual volume. Not modifying the virtual volume refers to keeping the content of the virtual volume in the respective entries of the virtual volume (rather than copying or moving the content of the virtual volume to a new virtual volume). The virtual volume converting instructions 602 include source metadata accessing instructions 604 to access a source metadata associated with the virtual volume, the source metadata including information for the first volume type (e.g., information indicating whether the virtual volume according to the first volume type supports a feature such as data deduplication, data compression, etc.). The virtual volume converting instructions 602 further include destination metadata generating instructions 606 to generate a destination metadata associated with the virtual volume, the destination metadata including information for the second volume type.

In some examples, the virtual volume according to the first volume type uses a feature, and the virtual volume according to the second volume type does not use the feature. In such examples, the source metadata includes information relating to the feature, and the destination metadata is without information relating to the feature.

In further examples, the virtual volume according to the second volume type uses a feature, and the virtual volume according to the first volume type does not use the feature. In such further examples, the destination metadata includes information relating to the feature, and the source metadata is without information relating to the feature.

In some examples, each respective entry of the virtual volume includes a pointer referencing an entry of the source metadata prior to completion of the converting. The machine-readable instructions upon execution cause the system to update pointer metadata so that the pointer in the respective entry references an entry of the destination metadata in response to the completion of the converting.

The machine-readable instructions further include write processing instructions 608 to, while the virtual volume is being converted from the first volume type to the second volume type, process a write operation that accesses a portion of the virtual volume and changes data in the accessed portion of the virtual volume. Processing the write operation can include either (1) performing the write operation to update data in the data store referred to by the virtual volume, or (2) log information of the write operation in a replay log for later replay of the write operation after the virtual volume conversion has completed.

Figure 7:
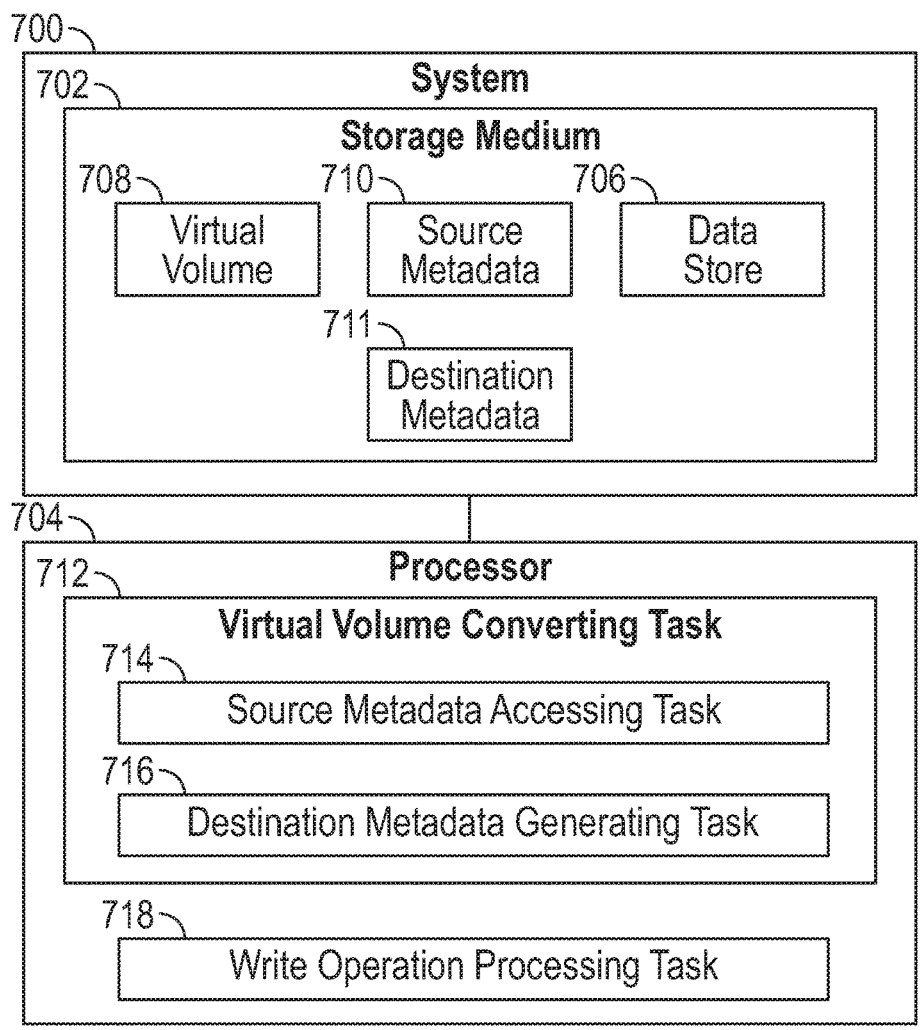
FIG. 7 is a block diagram of a system according to some examples.

FIG. 7 is a block diagram of a system 700 that includes a non-transitory storage medium 702 and a hardware processor 704 (or multiple hardware processors). A hardware processor can include a microprocessor, a core of a multi-core microprocessor, a microcontroller, a programmable integrated circuit, a programmable gate array, a digital signal processor, or another hardware processing circuit.

The storage medium 702 is to store a data store 706, a virtual volume 708, and a source metadata 710 for the virtual volume 708 according to a first volume type. The virtual volume 708 according to the first volume type includes entries associated with entries of the source metadata 710, and the entries of the source metadata 710 references respective data in the data store 706.

The hardware processor 704 is to perform various tasks. A hardware processor performing a task can refer to a single hardware processor performing the task or multiple hardware processors performing the task.

The tasks of the hardware processor 704 include a virtual volume converting task 712 that converts the virtual volume 708 from the first volume type to a second volume type without modifying the virtual volume 708.

The converting task 712 includes a source metadata accessing task 714 to access the source metadata 710 associated with the virtual volume 708. The converting task 712 further includes a destination metadata generating task 716 to generate a destination metadata 711 for the virtual volume 708 according to the second volume type.

As part of the converting task 712, the hardware processor 702 is to determine whether the source metadata 710 is translatable to the destination metadata 711 without reading data in the data store 706 referred to by the virtual volume 708. In response to determining that the source metadata 710 is translatable to the destination metadata 711 without reading the data referred to by the virtual volume 708, the hardware processor 702 is to translate the source metadata 710 to the destination metadata 711. In response to determining that the source metadata 710 is not translatable to the destination metadata 711 without reading the data referred to by the virtual volume 708, the hardware processor 702 is to read the data referred to by the virtual volume 708 and compute the destination metadata 711 based on the read data.

The tasks of the hardware processor 704 further include a write operation processing task 718 to, while the virtual volume 708 is being converted from the first volume type to the second volume type, process a write operation that accesses a portion of the virtual volume and changes data in the accessed portion of the virtual volume.

Figure 8:
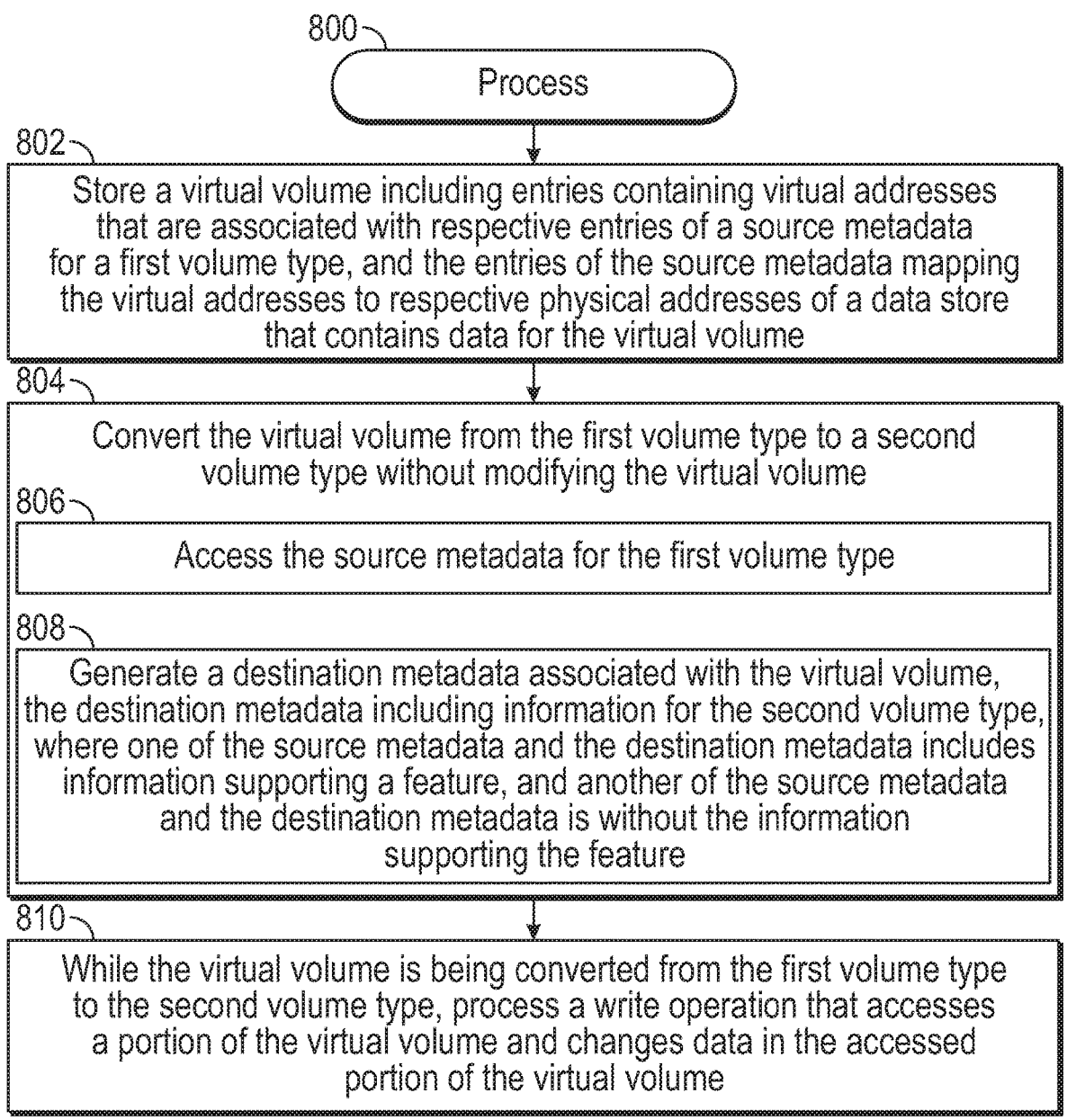
FIG. 8 is a flow diagram of a process according to further examples.

FIG. 8 is a flow diagram of a process 800 according to some examples of the present disclosure, which can be performed by a system comprising a hardware processor (e.g., the storage system 102 of FIG. 1 or the system 700 of FIG. 7).

The process 800 includes storing (at 802) a virtual volume including entries containing virtual addresses that are associated with respective entries of a source metadata for a first volume type, and the entries of the source metadata mapping the virtual addresses to respective physical addresses of a data store that contains data for the virtual volume.

The process 800 further includes converting (at 804) the virtual volume from the first volume type to a second volume type without modifying the virtual volume. The converting (804) includes accessing (at 806) the source metadata for the first volume type, and generating (at 808) a destination metadata associated with the virtual volume, the destination metadata including information for the second volume type, where one of the source metadata and the destination metadata includes information supporting a feature, and another of the source metadata and the destination metadata is without the information supporting the feature.

The process 800 further includes, while the virtual volume is being converted from the first volume type to the second volume type, processing (at 810) a write operation that accesses a portion of the virtual volume and changes data in the accessed portion of the virtual volume.

The storage medium 600 of FIG. 6 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

convert a virtual volume from a first volume type to a second volume type without modifying the virtual volume, the converting comprising:
accessing a source metadata associated with the virtual volume, the source metadata including information for the first volume type, and
generating a destination metadata associated with the virtual volume, the destination metadata including information for the second volume type; and
while the virtual volume is being converted from the first volume type to the second volume type, process a write operation that accesses a portion of the virtual volume and changes data in the accessed portion of the virtual volume.

2. The non-transitory machine-readable storage medium of claim 1, wherein the virtual volume according to the first volume type uses a feature, and the virtual volume according to the second volume type does not use the feature, wherein the source metadata includes information relating to the feature, and the destination metadata is without information relating to the feature.

3. The non-transitory machine-readable storage medium of claim 2, wherein the feature comprises one or both of data compression or data deduplication.

4. The non-transitory machine-readable storage medium of claim 1, wherein the virtual volume according to the second volume type uses a feature, and the virtual volume according to the first volume type does not use the feature, wherein the destination metadata includes information relating to the feature, and the source metadata is without information relating to the feature.

5. The non-transitory machine-readable storage medium of claim 1, wherein the converting comprises:
determining whether the source metadata is translatable to the destination metadata without reading data referred to by the virtual volume.

6. The non-transitory machine-readable storage medium of claim 5, wherein the converting comprises:
in response to determining that the source metadata is translatable to the destination metadata without reading the data referred to by the virtual volume, translate the source metadata to the destination metadata; and
in response to determining that the source metadata is not translatable to the destination metadata without reading the data referred to by the virtual volume, read the data referred to by the virtual volume and compute the destination metadata based on the read data.

7. The non-transitory machine-readable storage medium of claim 1, wherein the virtual volume comprises entries containing virtual addresses, and the entries of the virtual volume according to the first volume type are associated with corresponding entries of the source metadata, and the entries of the source metadata include address mapping information that maps respective virtual addresses of the virtual volume to physical addresses of a data store that contain data referred to by the virtual volume, and the entries of the virtual volume according to the second volume type are associated with corresponding entries of the destination metadata, and the entries of the destination metadata include address mapping information that maps respective virtual addresses of the virtual volume to physical addresses of the data store that contain data referred to by the virtual volume.

8. The non-transitory machine-readable storage medium 7, wherein a first entry of the virtual volume includes a pointer referencing an entry of the source metadata prior to completion of the converting, and wherein the instructions upon execution cause the system to update pointer metadata so that the pointer in the first entry references an entry of the destination metadata in response to the completion of the converting.

9. The non-transitory machine-readable storage medium 1, wherein the virtual volume according to the first volume type supports data deduplication, and the virtual volume according to the second volume type does not support data deduplication, and wherein the source metadata includes a first entry referencing a deduplication metadata that refers to a deduplication data store containing data shared by multiple virtual addresses of the virtual volume according to the first volume type, and the source metadata includes a second entry referencing a data store containing unshared data, and
wherein the converting produces the destination metadata that is without any entries referring to the deduplication metadata.

10. The non-transitory machine-readable storage medium 1, wherein the virtual volume according to the first volume type does not support data deduplication, and the virtual volume according to the second volume type supports data deduplication, and wherein the source metadata includes entries referencing a data store containing unshared data, and
wherein the converting produces the destination metadata that includes an entry referencing a deduplication metadata that refers to a deduplication data store containing data shared by multiple virtual addresses of the virtual volume according to the second volume type.

11. The non-transitory machine-readable storage medium 1, wherein the instructions upon execution cause the system to:
during the converting, store, in a replay log, information of a write operation to the virtual volume that is to cause a modification of a metadata associated with the virtual volume; and
after the converting is complete, replay the replay log to perform the write operation to the virtual volume and to update the destination metadata.

12. A system comprising:
a non-transitory storage medium to store a data store, a virtual volume, and a source metadata for the virtual volume according to a first volume type, the virtual volume according to the first volume type including entries associated with entries of the source metadata, and the entries of the source metadata referencing respective data in the data store;
a processor to:
convert the virtual volume from the first volume type to a second volume type without modifying the virtual volume, the converting comprising:
accessing the source metadata associated with the virtual volume, and
generating a destination metadata for the virtual volume according to the second volume type; and
while the virtual volume is being converted from the first volume type to the second volume type, process a write operation that accesses a portion of the virtual volume and changes data in the accessed portion of the virtual volume.

13. The system of claim 12, wherein the processor is to:
determine whether the source metadata is translatable to the destination metadata without reading data in the data store referred to by the virtual volume;
in response to determining that the source metadata is translatable to the destination metadata without reading the data referred to by the virtual volume, translate the source metadata to the destination metadata; and
in response to determining that the source metadata is not translatable to the destination metadata without reading the data referred to by the virtual volume, read the data referred to by the virtual volume and compute the destination metadata based on the read data.

14. The system of claim 13, wherein the first volume type does not support data deduplication, and the second volume type supports data deduplication, the destination metadata including information to support data deduplication, and the source metadata without the information to support data deduplication, and wherein the converting comprises reading the data referred to by the virtual volume and computing the destination metadata based on the read data.

15. The system of claim 13, wherein the first volume type supports data deduplication, and the second volume type does not support data deduplication, the source metadata including information to support data deduplication, and the destination metadata without the information to support data deduplication, and wherein the converting translates the source metadata to the destination metadata without reading the data referred to by the virtual volume.

16. The system of claim 13, wherein the first volume type does not support data compression, and the second volume type supports data compression, the destination metadata including information to support data compression, and the source metadata without the information to support data compression, and wherein the converting translates the source metadata to the destination metadata without reading the data referred to by the virtual volume.

17. The system of claim 13, wherein the first volume type supports data compression, and the second volume type does not support data compression, the source metadata including information to support data compression, and the destination metadata without the information to support data compression, and wherein the converting translates the source metadata to the destination metadata without reading the data referred to by the virtual volume if the data referred to by the virtual volume is uncompressed.

18. The system of claim 12, wherein the processor is to:
during the converting, store, in a replay log, information of a write operation to the virtual volume that is to cause a modification of a metadata associated with the virtual volume; and
after the converting is complete, replay the replay log to perform the write operation to the virtual volume and to update the destination metadata.

19. A method performed by a system comprising a hardware processor, comprising:
storing a virtual volume including entries containing virtual addresses that are associated with respective entries of a source metadata for a first volume type, and the entries of the source metadata mapping the virtual addresses to respective physical addresses of a data store that contains data for the virtual volume;

converting the virtual volume from the first volume type to a second volume type without modifying the virtual volume, the converting comprising:
  accessing the source metadata for the first volume type, and
  generating a destination metadata associated with the virtual volume, the destination metadata including information for the second volume type, wherein one of the source metadata and the destination metadata includes information supporting a feature, and another of the source metadata and the destination metadata is without the information supporting the feature; and while the virtual volume is being converted from the first volume type to the second volume type, processing a write operation that accesses a portion of the virtual volume and changes data in the accessed portion of the virtual volume.

20. The method of claim 19, wherein the feature comprises one or both of data deduplication or data compression.

* * * * *